(12) United States Patent
Sun et al.

(10) Patent No.: US 8,817,847 B2
(45) Date of Patent: Aug. 26, 2014

(54) DYNAMIC IMPROVEMENT OF LINK SYMMETRY IN CO-LOCATED PLC AND RF NETWORKS

(75) Inventors: Yanjun Sun, Richardson, TX (US); Gang Xu, Allen, TX (US); Soon-Hyeok Choi, Allen, TX (US); Bhadra Sandeep, Dallas, TX (US); Xiaolin Lu, Plano, TX (US); Ariton E. Xhafa, Plano, TX (US); Minghua Fu, Plano, TX (US); Robert Liang, Frisco, TX (US); Susan Yim, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 99 days.

(21) Appl. No.: 13/553,204

(22) Filed: Jul. 19, 2012

(65) Prior Publication Data

US 2013/0188670 A1    Jul. 25, 2013

Related U.S. Application Data

(60) Provisional application No. 61/510,577, filed on Jul. 22, 2011.

(51) Int. Cl.
*H04B 17/02*    (2006.01)
*H04B 1/38*    (2006.01)
*H04B 3/54*    (2006.01)
*H04B 3/58*    (2006.01)

(52) U.S. Cl.
CPC ... *H04B 3/58* (2013.01); *H04B 3/54* (2013.01)

USPC .......................................... 375/211; 375/219

(58) Field of Classification Search
USPC .................... 375/211, 219, 210; 37/353, 401; 370/353, 401
See application file for complete search history.

(56) References Cited

U.S. PATENT DOCUMENTS

| 2006/0291483 A1* | 12/2006 | Sela ............................. 370/401 |
| 2007/0167144 A1 | 7/2007 | Koga et al. |
| 2011/0051721 A1 | 3/2011 | Brothwell et al. |

FOREIGN PATENT DOCUMENTS

| EP | 2234338 A1 | 9/2010 |
| WO | 2011073677 A1 | 6/2011 |

* cited by examiner

*Primary Examiner* — Khai Tran
(74) *Attorney, Agent, or Firm* — Steven A. Shaw; Frederick J. Telecky, Jr.

(57) ABSTRACT

An electronic communication device comprises a first transceiver capable of a bi-directional communication session on a first communication medium; a second transceiver capable of a bi-directional communication session on a second communication medium; and a control logic coupled to the first transceiver and the second transceiver, wherein the control logic is configured to receive, from the first transceiver, a first signal, and cause, in response to the first signal, data transmitted by the first transceiver on the first communication medium as part of a communication session to be transmitted instead by the second transceiver on the second communication medium while the first transceiver continues to receive data as part of the communication session.

23 Claims, 3 Drawing Sheets

DYNAMIC IMPROVEMENT OF LINK SYMMETRY IN CO-LOCATED PLC AND RF NETWORKS

CROSS-REFERENCE TO RELATED APPLICATION

The present application claims priority to U.S. Provisional Patent Application No. 61/510,577 filed on Jul. 22, 2011, which is incorporated by reference in its entirety.

BACKGROUND

Narrow-band power line communication (PLC) transceivers and low-power radio frequency (RF) transceivers may be used in sensor networks and smart grid networks. Transceivers are able to transmit and receive data; thus, they may be referred to as bi-directional communication devices. Bi-directional communication devices may be said to exhibit symmetry when the packet delivery ratios are equivalent or substantially equivalent in the transmitting and receiving directions. On the other hand, asymmetry may occur when the packet delivery ratios are not substantially equivalent. Asymmetric communication may occur due to noise and may limit network throughput. Noise such as wireless local area network (WLAN) transmissions may interfere with RF transmissions, and impulsive noises from appliances such as washing machines may interfere with PLC transmissions. Some protocols such as media access control (MAC) using Automatic Repeat-reQuest (ARQ) may choose not to employ media, or links, exhibiting asymmetry. As PLC, RF, and other technologies proliferate, embedded devices may incorporate a combination of PLC, RF, and other technologies to improve network connectivity. For example, some smart meters may incorporate an 802.15.4 RF transceiver and a PLC transceiver. Because such devices operate on multiple types of networks, they may be referred to as hybrid devices.

SUMMARY

In some embodiments, an electronic communication device is disclosed as comprising a first transceiver capable of a bi-directional communication session on a first communication medium; a second transceiver capable of a bi-directional communication session on a second communication medium; and a control logic coupled to the first transceiver and the second transceiver, wherein the control logic is configured to receive, from the first transceiver, a first signal, and cause, in response to the first signal, data transmitted by the first transceiver on the first communication medium as part of a communication session to be transmitted instead by the second transceiver on the second communication medium while the first transceiver continues to receive data as part of the communication session.

In other embodiments, a method for electronic communication is disclosed as comprising providing a first transceiver capable of a bi-directional communication session on a first communication medium, a second transceiver capable of a bi-directional communication session on a second communication medium, and a control logic coupled to the first transceiver and the second transceiver; receiving, by the control logic from the first transceiver, a first signal; and causing, by the control logic in response to the first signal, data transmitted by the first transceiver on the first communication medium as part of a communication session to be transmitted instead by the second transceiver on the second communication medium while the first transceiver continues to receive data as part of the communication session.

In yet other embodiments, an electronic communication device is disclosed as comprising a first transceiver capable of a bi-directional communication session on a first communication medium; a second transceiver capable of a bi-directional communication session on a second communication medium; and a control logic coupled to the first transceiver and the second transceiver, wherein the control logic is configured to receive, from the first transceiver, a first signal, determine an existence of asymmetric communication in the first communication medium, broadcast, to neighboring nodes, information related to the first signal and information related to the existence of asymmetric communication in the first communication medium, and couple, in response to at least one of the first signal and the existence of asymmetric communication in the first communication medium, the first communication medium and the second communication medium.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name, but not function. In the following discussion and in the claims, the terms "including" and "comprising" are used in an open-ended fashion and thus should be interpreted to mean "including, but not limited to . . . ." Also, the terms "couple" and "couples" are intended to mean either an indirect or direct electrical connection; thus, if a first device couples to a second device, that connection may be through a direct electrical connection or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

PLC generally refers to communication of data on a conductor that is also used to carry alternating current (AC) electrical power, for example, power lines delivering electrical power at about 110 VAC at 60 Hz or about 220 VAC at 50

Hz. PLC communication may be on a power line that is distributing power at a stepped down voltage to residential buildings or within a building such as an office building. In some cases, PLC may not propagate across distribution transformers, for example across step-down transformers, without some form of signal processing to bridge across the two sides or windings of the subject transformer. PLC technologies include PoweRline Intelligent Metering Evolution (PRIME), G3, and Institute of Electrical and Electronics Engineers (IEEE) 1901.2. RF communication generally refers to communication of data on radio waves in the frequency range of 3 kHz to 300 GHz. RF technologies include Zigbee, WLAN, Wi-Fi, and Bluetooth.

Figure 1:
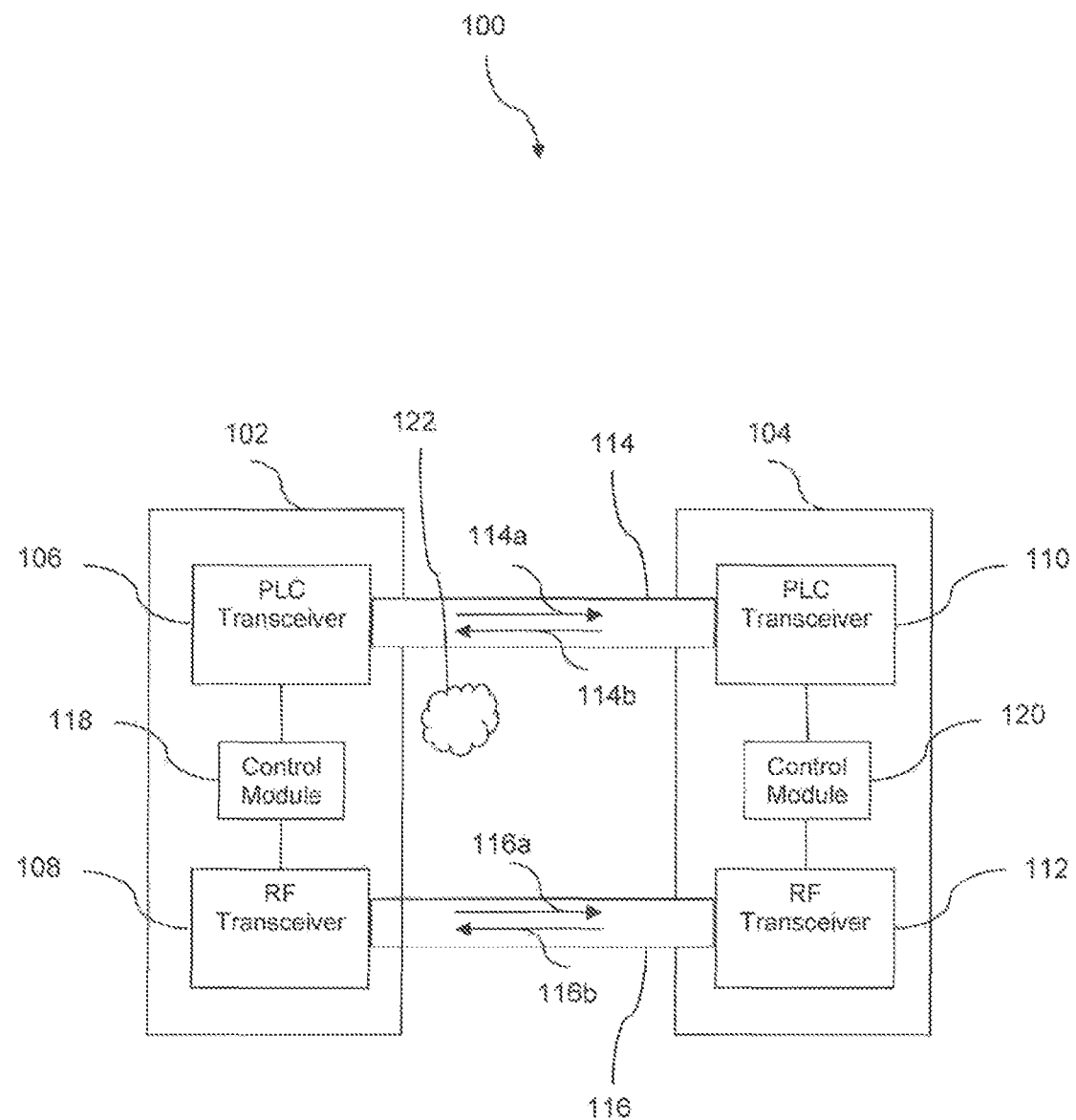
FIG. 1 shows a system of communication between two electronic communication devices according to an embodiment of the disclosure.

FIG. 1 shows a system of communication 100 between a first electronic communication device 102 and a second electronic communication device 104 according to an embodiment of the disclosure. The first device 102 may comprise a first PLC transceiver 106, a first RF transceiver 108, and a first control module 118. The second device may comprise a second PLC transceiver 110, a second RF transceiver 112, and a second control module 120. The first PLC transceiver 106, the first RF transceiver 108, and the first control module 118 may be implemented as a single integrated circuit or as a system on a chip (SOC). Likewise, the second PLC transceiver 110, the second RF transceiver 112, and the second control module 120 may be implemented as a single integrated circuit or as an SOC. Alternatively, the control modules 118, 120 may be implemented separately from the transceivers 106, 108, 110, 112.

The devices 102, 104 may be referred to as hybrid devices. In an embodiment, the devices 102, 104 may be smart meters where the first PLC transceiver 106 and the second PLC transceiver 110 are narrow-band PLC transceivers and the first RF transceiver 108 and the second RF transceiver 112 are 802.15.4 RF transceivers. Alternatively, the first device 102 may be a smart meter, and the second device 104 may be a monitor or data gathering device that promotes collecting usage reports from a plurality of smart meters and forwarding them to a centralized processing point of a power distribution company. Smart meters typically refer to electrical meters that record information related to consumption of electric energy. Smart meters typically comprise real-time or near real-time sensors and provide power outage notification and power quality monitoring. Smart meters may provide that information to a central system associated with a power provider. Smart meters may also communicate with each other in high-density population areas or otherwise using collaborative network technology. The devices 102, 104 may comprise transceivers employing other technologies as well. In other embodiments, the devices 102, 104 may not be smart meters and instead may be other devices.

The first PLC transceiver 106 and the second PLC transceiver 110 may communicate with each other over a PLC link 114 in a first direction 114a and a second direction 114b. A PLC link may refer to the power line or conductor itself that provides communication of data along with AC electrical power. The first RF transceiver 108 and the second RF transceiver 112 may communicate with each other over an RF link 116 in a first direction 116a and a second direction 116b.

The control modules 118, 120 may communicative with their respective transceivers 106, 108, 110, 112. The control modules 118, 120 may each be executed by a separate processor associated with their respective devices 102, 104. The control modules 118, 120 may each monitor, receive, process, and distribute data from their respective transceivers 106, 108, 110, 112 and links 114, 116 and may do so through at least one sub-module. The data may relate to communication quality, which is described further below. When the devices 102, 104 are described below as monitoring, receiving, processing, distributing, or performing similar functions, it may be understood that they are doing so through their respective control modules 118, 120. The control modules 118, 120 may also each cause changes in communication behavior among their respective transceivers 106, 108, 110, 112 and links 114, 116 and may do so through at least one other sub-module. When the devices 102, 104 are described below as causing changes in communication behavior or performing similar functions, it may be understood that they are doing so through their respective control modules 118, 120. In some contexts, the control modules 118, 120 may be referred to as control logic.

In an embodiment, the system 100 may initiate a communication session across the PLC link 114 in both directions 114a, 114b, but preferably not across the RF link 116. Under some conditions, the PLC link 114 may support higher throughput and/or a higher communication rate than the RF link 116. The PLC link 114, when the transceivers 106, 110 communicate in both directions 114a, 114b, may be referred to as operating in a full duplex mode of operation. The terms "communication session" and "communication sessions" may be understood broadly to refer to any ongoing communication between two devices. A communication session need not be associated with any particular communication layer, but may instead refer to a communication activity that has duration in time and comprises a plurality of packets that are abstracted as parts of the communication or communication session. A communication session may comprise, for example, a smart meter transmitting a monthly power usage report in response to a request. The monthly usage report may comprise usage data and metrics on service quality.

Electrical or electromagnetic noise 122 may occur near the system 100. For example, the noise 122 may occur near the device 102 and affect nearby packet reception, but not nearby packet transmission. Furthermore, as mentioned above, if the noise 122 is an impulsive noise from an appliance such as a washing machine, then the noise 122 may affect PLC communication, but not RF communication. In short, the noise 122 may affect only PLC communication in the direction 114b from the second device 104 to the first device 102. The PLC link 114 may therefore be said to be asymmetric due to the reduced packet delivery ratio, or degraded communication quality, of the communication in the direction 114b relative to the direction 114a. Sources other than noise, including network deployment, obstacles, and traffic load, may also cause such asymmetry. In addition to packet delivery ratio, communication quality may be measured in terms of throughput, signal to noise ratio, packet data rate, packet delivery latency, energy per bit, expected transmission count, a number of probing packets received in a given window, and other quality metrics.

If the RF link 116 is available, then the system 100 may choose to discontinue PLC communication in the direction 114b and initiate communication in the RF link 116 in the direction 116b. The communication in the system 100 may therefore exhibit improved symmetry by coupling the PLC link 114 with the RF link 116, in other words, by communicating across the PLC link 114 in the direction 114a and across the RF link 116 in the direction 116b. In this configuration, the PLC link 114 may be said to operate in a half duplex mode of operation (e.g., in the direction 114a and not in the direction 114b), and the RF link 116 may be said to operate in a half duplex mode of operation (e.g., in the direction 116b and not in the direction 116a). The words "couple" and "coupling" do not necessarily imply a physical coupling, but may also include a virtual coupling in the sense that two media each provide a link for a single communication session at the same time; one medium provides a link for one direction of communication in the communication session, and the other medium provides a link for the opposite direction of communication in the same communication session. The system 100 may choose to couple the links after first comparing the ability to improve symmetry, the cost associated with coupling, and other possible performance gains as improving symmetry does not necessarily improve throughput. The system 100 may employ a handshake process in order to transition the communication from the PLC link 114 in the direction 114b to the RF link 116 in the direction 116b.

If the communication quality improves in the PLC link 114 in the direction 114b and the PLC link 114 therefore again exhibits a substantially symmetrical communication quality, then the system 100 may choose to discontinue the communication session in the RF link 116 in the direction 116b and re-initiate that communication session in the PLC link 114 in the direction 114b. Thus, the transceivers 106, 110 may return to a full duplex mode of operation of the PLC link 114. Once again, the system 100 may employ a handshake process, this time to transition the communication session from the RF link 116 to the PLC link 214. The system 100 may prefer to return to the PLC link 114 communication due to, for example, a higher throughput provided by the PLC link 114 as compared to the throughput provided by the RF link 116.

While a switch from the PLC link 114 in the direction 114b to the RF link 116 in the direction 114b is described above, the system 100 may instead choose to switch from the RF link 116 to the PLC link 114, or the system 100 may choose to switch from other directions in the PLC link 114 and the RF link 116, depending on link conditions and other factors. The subsequently described embodiments may also permit such link flexibility.

In an embodiment, the system 100 may broadcast to neighboring nodes the communication quality and the existence of asymmetric communication related to the devices 102, 104 and the links 114, 116. Those nodes may, in turn, broadcast the same information to their neighboring nodes and so on. In that respect, the system 100 may be said to be distributed.

Figure 2:
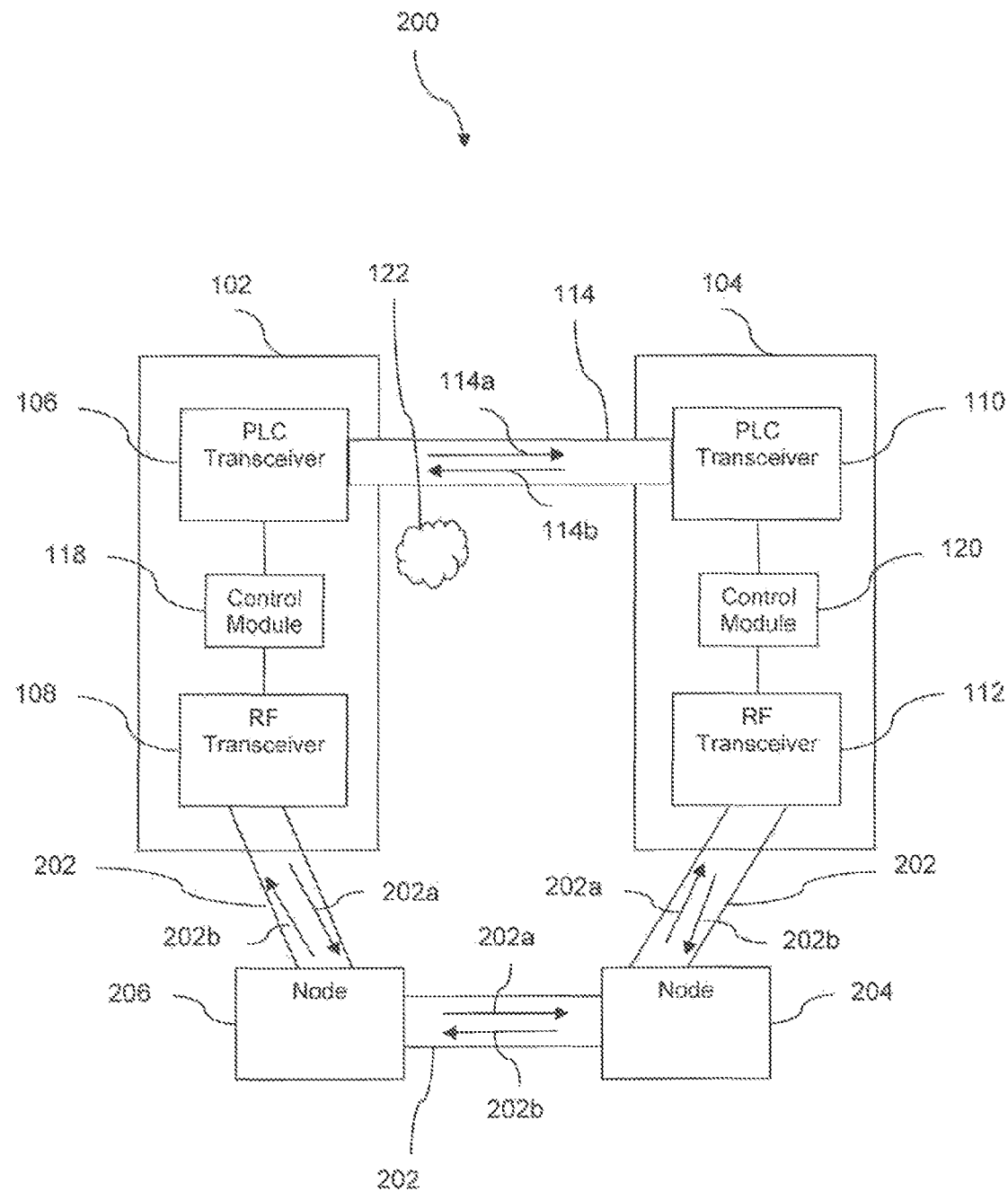
FIG. 2 shows a system of communication between two electronic communication devices according to another embodiment of the disclosure.

FIG. 2 shows a system of communication 200 substantially similar to the system 100 in FIG. 1. As in FIG. 1, if there is a reduced packet delivery ratio of the communication in the direction 114b relative to the direction 114a due to the noise 122, then the system 200 may choose to employ RF communication. In the system 200, however, the first RF transceiver 108 and the second RF transceiver 112 may not be able to directly communicate with each other. This could be due, for example, to the distance between the first RF transceiver 108 and the second RF transceiver 112. The distance could be an issue for the RF communication because RF is a wireless technology, but it could be a non-issue for the PLC communication because PLC is a wired technology.

Accordingly, the system 200 may communicate on a new RF link 202 in a direction 202b through a first node 204 and a second node 206. The nodes 204, 206 may be hybrid devices similar to the first device 102 and the second device 104. Alternatively, the nodes 204, 206 may not be hybrid devices and may only communicate via RF links. The communication in the system 200 may therefore exhibit improved symmetry by communicating across the PLC link 114 in the direction 114a and across the RF link 202 in the direction 202b. As in FIG. 1, if the communication quality improves in the PLC link 114 in the direction 114b and the PLC link 114 therefore again exhibits a substantially symmetrical communication quality, then the system 200 may choose to discontinue the communication session in the RF link 202 in the direction 202b and re-initiate that communication session in the PLC link 114 in the direction 114b.

While employing the RF link 202, the acknowledgment process may take longer than typically expected because the acknowledgments may route through a plurality of nodes, for example the first node 204 and the second node 206, in other words, through two additional nodes compared to a direct route across the PLC link 114 in the direction 114a as in FIG. 1. As a result, it may be desirable to modify the media access control (MAC) protocol in the devices 102, 104 in order to allow delayed acknowledgments. Alternatively, even if the PLC link 114 is exhibiting poorer quality in the direction 114b relative to the direction 114a, the system 200 may still send acknowledgments in the direction 114b because acknowledgments represent relatively small amounts of data and are thus less likely to be affected by the noise 122.

While a communication session where the first RF transceiver 108 and the second RF transceiver 112 may not be able to directly communicate with each other is described above, other embodiments may provide for instances when the first PLC transceiver 106 and the second PLC transceiver 110 are not able to directly communicate with each other. Such an inability could be due, for example, to link noise along the PLC link 114. Accordingly, the system 200 may communicate on a new PLC link through multiple nodes while simultaneously communicating on the RF link 116 directly from the first RF transceiver 108 to the second RF transceiver 112.

In an embodiment, the PLC link 114 that couples the devices 102, 104 may pass through a plurality of other nodes (not shown). For example, PLC repeater nodes and/or PLC bridging nodes may be positioned in the PLC link 114 to promote PLC communications over longer distances. When crossing step down transformers, a PLC bridging node may demodulate the PLC transmission on one winding side of the step down transformer, modulate the PLC transmission, and retransmit the PLC transmission on a second winding side of the step down transformer. In an embodiment, the PLC bridging nodes and/or PLC repeater nodes may not be hybrid devices or may not carry bearer traffic over RF links.

Figure 3:
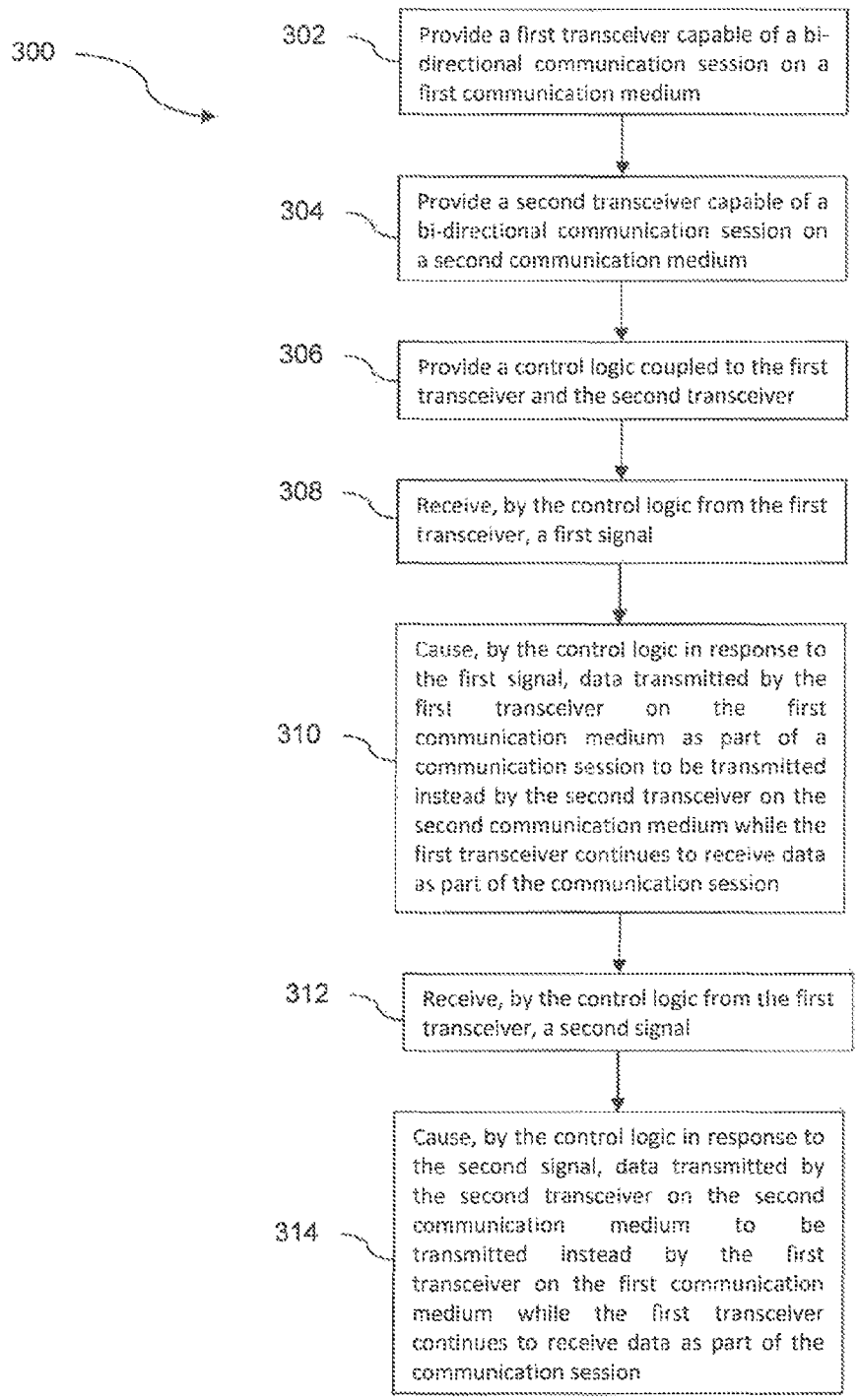
FIG. 3 shows a method for electronic communication according to an embodiment of the disclosure.

FIG. 3 shows a method 300 according to an embodiment of the disclosure. Some actions may be performed in a different order from that shown in FIG. 3, and two or more actions may be performed in parallel rather than serially. At block 302, a system may provide a first transceiver capable of a bi-directional communication session on a first communication medium. The system may be the system 100, the first transceiver may be the first PLC transceiver 106, and the first communication medium may be the PLC link 114.

At block 304, the system may provide a second transceiver capable of a bi-directional communication session on a second communication medium. The second transceiver may be the first RF transceiver 108, and the second communication medium may be the RF link 116.

At block 306, the system may provide a control logic coupled to the first transceiver and the second transceiver. The control logic may be the first control logic 118.

At block 308, the control logic 118 may receive, from the first transceiver, a first signal. The first signal may be related to the presence of the noise 122.

At block 310, the control logic 118 may cause, in response to the first signal, data transmitted by the first transceiver on the first communication medium as part of a communication session to be transmitted instead by the second transceiver on the second communication medium while the first transceiver continues to receive data as part of the communication session.

At block 312, the control logic 118 may receive, from the first transceiver, a second signal. The second signal may be related to the absence of the noise 122.

At block 314, the control logic 118 may cause, in response to the second signal, data transmitted by the second transceiver on the second communication medium to be transmitted instead by the first transceiver on the first communication medium while the first transceiver continues to receive data as part of the communication session.

Certain features that are described in the context of separate embodiments can also be combined and implemented as a single embodiment. Conversely, various features that are described in the context of a single embodiment can also be implemented in multiple embodiments separately or in any suitable subcombinations. Moreover, although features may be described as acting in certain combinations and even initially claimed as such, one or more features from a combination as described or a claimed combination can in certain cases be excluded from the combination, and the claimed combination may be directed to a subcombination or variation of a subcombination. Although various aspects of the invention are set out in the independent claims, other aspects of the invention comprise other combinations of features from the embodiments and/or from the dependent claims with the features of the independent claims, and not solely the combinations explicitly set out in the claims. Certain functions that are described in this specification may be performed in a different order and/or concurrently with each other. Furthermore, if desired, one or more of the above-described functions may be optional or may be combined.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session,
wherein the first communication medium and the second communication medium are one of a radio frequency link and a power line communication link.

2. The device of claim 1, wherein the control logic is further configured to:
receive a second signal from the first transceiver; and
cause, in response to the second signal, data transmitted by the second transceiver on the second communication medium to be transmitted instead by the first transceiver on the first communication medium while the first transceiver continues to receive data as part of the communication session.

3. The device of claim 2, wherein the second signal is related to at least one of:
throughput,
signal to noise ratio,
packet delivery ratio,
packet data rate,
packet delivery latency,
energy per bit,
expected transmission count, and
number of probing packets received in a given time window.

4. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session,
wherein the first signal is related to at least one of:
throughput,
signal to noise ratio,
packet delivery ratio,
packet data rate,
packet delivery latency,
energy per bit,
expected transmission count, and
number of probing packets received in a given time window.

5. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session, wherein the first communication medium and the second communication medium are the same.

6. An electronic communication device comprising:
a first transceiver capable of a bi-directional communication session on a first communication medium;
a second transceiver capable of a bi-directional communication session on a second communication medium;
a control logic coupled to the first transceiver and the second transceiver, wherein the control logic is configured to;
receive, from the first transceiver, a first signal,
cause, in response to the first signal, data transmitted by the first transceiver on the first communication medium as part of a communication session to be transmitted instead by the second transceiver on the second communication medium while the first transceiver continues to receive data as part of the communication session; and
an extended acknowledgment timeout parameter.

7. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to:
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session, wherein the data transmitted by the second transceiver on the second communication medium is transmitted through at least one relay node.

8. The device of claim 7, wherein acknowledgments transmitted on the second communication medium are not sent or received through a relay node.

9. A method for electronic communication comprising:
providing a first transceiver capable of a bi-directional communication session on a first communication medium, a second transceiver capable of a bi-directional communication session on a second communication medium, wherein the first communication medium and the second communication medium are the same; and
a control logic coupled to the first transceiver and the second transceiver;
receiving, by the control logic from the first transceiver, a first signal; and
causing, by the control logic in response to the first signal, data transmitted by the first transceiver on the first communication medium as part of a communication session to be transmitted instead by the second transceiver on the second communication medium while the first transceiver continues to receive data as part of the communication session.

10. The method of claim 9, further comprising:
receiving, by the control logic from the first transceiver, a second signal; and
causing, by the control logic in response to the second signal, data transmitted by the second transceiver on the second communication medium to be transmitted instead by the first transceiver on the first communication medium while the first transceiver continues to receive data as part of the communication session.

11. The method of claim 10, wherein the second signal is related to at least one of:
throughput,
signal to noise ratio,
packet delivery ratio,
packet data rate,
packet delivery latency,
energy per bit,
expected transmission count, and
number of probing packets received in a given time window.

12. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session, wherein the first signal is related to at least one of:
throughput,
signal to noise ratio,
packet delivery ratio,
packet data rate,
packet delivery latency,
energy per bit,
expected transmission count, and
number of probing packets received in a given time window.

13. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session,
wherein
the first communication medium and the second communication medium are one of a radio frequency link and a power line communication link.

14. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session, wherein the first communication medium and the second communication medium are accessed in a single device.

15. The method of claim 14, wherein the single device is configured with an extended acknowledgment timeout parameter.

16. An electronic communication device comprising:
a first transceiver capable of a bi-directional communication session on a first communication medium;

a second transceiver capable of a bi-directional communication session on a second communication medium; and
a control logic coupled to the first transceiver and the second transceiver, wherein the control logic is configured to
receive, from the first transceiver, a first signal, and
cause, in response to the first signal, data transmitted by the first transceiver on the first communication medium as part of a communication session to be transmitted instead by the second transceiver on the second communication medium while the first transceiver continues to receive data as part of the communication session, wherein the data transmitted by the second transceiver on the second communication medium is transmitted through at least one relay node.

17. The method of claim 16, wherein acknowledgments transmitted on the second communication medium are not sent or received through a relay node.

18. An electronic communication device comprising:
a first transceiver capable of a bi-directional communication session on a first communication medium;
a second transceiver capable of a bi-directional communication session on a second communication medium; and
a control logic coupled to the first transceiver and the second transceiver, wherein the control logic is configured to:
receive, from the first transceiver, a first signal,
determine an existence of asymmetric communication in the first communication medium,
broadcast, to neighboring nodes, information related to the first signal and information related to the existence of asymmetric communication in the first communication medium, and
couple, in response to at least one of the first signal and the existence of asymmetric communication in the first communication medium, the first communication medium and the second communication medium.

19. The device of claim 18, wherein the control logic is further configured to:
receive, from the first transceiver, a second signal,
determine an existence of substantially symmetric communication in the first communication medium, and
decouple, in response to at least one of the second signal and the existence of substantially symmetric communication in the first communication medium, the first bi-directional medium and the second bi-directional medium.

20. The device of claim 18, wherein the coupling is based on at least one of:
an ability to improve communication symmetry,
a cost, and
performance gains.

21. The device of claim 18, wherein the neighboring nodes re-broadcast to additional nodes at least one of information related to the first signal and information related to the existence of asymmetric communication.

22. The method of claim 18, wherein
the first communication medium and the second communication medium are one of a radio frequency link and a power line communication link, and
the first bi-directional medium and the second bi-directional medium are not the same.

23. The method of claim 18, wherein the first communication medium and the second communication medium are the same.

* * * * *